(12) United States Patent
Karajgi et al.

(10) Patent No.: US 12,269,448 B2
(45) Date of Patent: Apr. 8, 2025

(54) ACTUATOR FOR PARKING BRAKE

(71) Applicant: HL MANDO CORPORATION, Pyeongtaek-si (KR)

(72) Inventors: Sudhirkumar S Karajgi, Haryana (IN); Prakash D Sunke, Haryana (IN)

(73) Assignee: HL MANDO CORPORATION, Pyeongtaek si (KR)

( * ) Notice: Subject to any disclaimer, the term of this patent is extended or adjusted under 35 U.S.C. 154(b) by 307 days.

(21) Appl. No.: 17/774,598

(22) PCT Filed: Oct. 15, 2020

(86) PCT No.: PCT/KR2020/014082
§ 371 (c)(1),
(2) Date: May 5, 2022

(87) PCT Pub. No.: WO2021/091112
PCT Pub. Date: May 14, 2021

(65) Prior Publication Data
US 2022/0396253 A1  Dec. 15, 2022

(30) Foreign Application Priority Data
Nov. 6, 2019  (KR) .......................... 10-2019-0140809

(51) Int. Cl.
*B60T 13/74* (2006.01)
*F16D 65/14* (2006.01)
(Continued)

(52) U.S. Cl.
CPC ............ *B60T 13/746* (2013.01); *F16D 65/14* (2013.01); *B60T 2270/40* (2013.01);
(Continued)

(58) Field of Classification Search
CPC ...... B60T 13/746; B60T 13/741; B60T 1/005; B60T 2270/40; F16D 65/14;
(Continued)

(56) References Cited

U.S. PATENT DOCUMENTS 6,267,207 B1  7/2001 Fleischer et al.
2013/0270047 A1*  10/2013 Kim ........................ F16D 65/18
188/72.1
(Continued)

FOREIGN PATENT DOCUMENTS

DE  19807328  9/1999
DE  102004048674  6/2005
(Continued)

OTHER PUBLICATIONS

International Search Report (PCT/ISA/210) issued in PCT Application No. PCT/KR2020/014082 dated Feb. 2, 2021 with English Translation.
(Continued)

Primary Examiner — Pamela Rodriguez
(74) Attorney, Agent, or Firm — LEE, HONG, DEGERMAN, KANG & WAIMEY (57) ABSTRACT

Disclosed is an actuator for a parking brake. In accordance with an aspect of the disclosure an actuator for a parking brake includes a motor generating power; a reduction gear portion configured to transmit the power of the motor to a parking portion implementing the parking braking of a vehicle; a locking portion configured to limit rotation of the reduction gear portion; and a housing in which the motor, the reduction gear portion, and the locking portion are accommodated; wherein the locking portion is configured to a lock gear coupled to the reduction gear portion to rotate together, a lever provided to be engaged with the lock gear through a hinge motion, an elastic member elastically supporting the
(Continued)

lever toward the lock gear, and an electromagnet member that generates electromagnetic force when the power is applied to separate the lever from the lock gear.

9 Claims, 5 Drawing Sheets (51) Int. Cl.
*F16D 121/22* (2012.01)
*F16D 121/24* (2012.01)
*F16D 125/50* (2012.01)
*F16D 127/06* (2012.01)
*F16H 57/02* (2012.01)

(52) U.S. Cl.
CPC ...... *F16D 2121/22* (2013.01); *F16D 2121/24* (2013.01); *F16D 2125/50* (2013.01); *F16D 2127/06* (2013.01); *F16H 2057/02034* (2013.01); *F16H 2057/02082* (2013.01)

(58) Field of Classification Search
CPC .............. F16D 2127/06; F16D 63/006; F16D 2121/22; F16D 2121/24; F16D 2125/50; F16H 35/00; F16H 57/02; F16H 2035/005; F16H 2057/02082; F16H 2057/02034

See application file for complete search history.

(56) References Cited

U.S. PATENT DOCUMENTS

2019/0152460 A1    5/2019  Antanaitis et al.
2022/0388489 A1*  12/2022  Karajgi ................... F16D 65/16
2022/0396252 A1*  12/2022  Karajgi ................. B60T 13/741

FOREIGN PATENT DOCUMENTS

| JP | 2010-058788 A | 3/2010 |
| KR | 10-2012-0134277 A | 12/2012 |
| KR | 10-2013-0020045 A | 2/2013 |
| WO | 0042333 | 7/2000 |

OTHER PUBLICATIONS

Written Opinion (PCT/ISA/237) issued in PCT Application No. PCT/KR2020/014082 dated Feb. 2, 2021.
Deutsches Patent- und Markenamt Application No. 112020005457.8, Office Action dated Oct. 29, 2024, 4 pages.

* cited by examiner

ACTUATOR FOR PARKING BRAKE

CROSS-REFERENCE OF RELATED APPLICATIONS

This application is the U.S. National Phase under 35 U.S.C. § 371 of International Patent Application No. PCT/KR2020/014082, filed on Oct. 15, 2020, which claims the benefit of Korean Patent Application No. 10-2019-0140809, filed on Nov. 6, 2019, the entire disclosures of each are incorporated by reference herein.

TECHNICAL FIELD

The disclosure relates to an actuator for a parking brake, and more particularly, to an actuator for a parking brake capable of stably maintaining a parking braking state when the parking brake is operated.

BACKGROUND ART

Generally, a vehicle is equipped with a brake system for performing braking essentially. Such a brake system requires a service brake function that provides braking force in a driving situation of the vehicle, and a parking brake function that maintains the vehicle in a stopped state when parking.

In a conventional parking brake, a foot brake driven by pedaling with a foot and a hand brake by pulling a lever by a hand are mainly used. For the hand brake, a user pulls the lever up with one hand with a lot of force to operate a lever of the parking brake, so that drivers who stop and park frequently a vehicle may injure their backs and put strain on their arms. Furthermore, a lever of the parking brake is located in a center of a console, which limits utilization of an indoor space of a vehicle.

Therefore, nowadays, a method of implementing electro-mechanical parking braking by using an actuator that generates braking force by a motor by receiving the driver's intention for parking braking as an electrical signal, such as pressing a button is being developed.

During a parking brake of a vehicle, a parking portion, such as a piston and a nut-spindle of a caliper brake and a parking brake shoe of a drum brake, maintains braking force. However, even if the parking portion maintains parking braking power, if there is a variant that prevents maintenance of parking braking, such as receiving an external shock or having to park a vehicle on a slope, the parking braking state of the vehicle may be released and then the vehicle may move. Accordingly, to prevent the vehicle from moving in spite of the parking braking state, stones or struts are often placed between wheels or at a rear of the wheels.

To maintain the parking braking state when a parking brake function of the vehicle is operated as described above, various locking methods have been developed such as a separate locking gear that is provided in a gear portion of the actuator so as to maintain the fixed state of the actuator.

DISCLOSURE

Technical Problem

An aspect of the disclosure is to provide an actuator for a parking brake capable of suppressing a roll back of a vehicle during a parking braking.

Another aspect of the disclosure is to provide an actuator for a parking brake capable of improving responsiveness and stability during the parking braking.

Another aspect of the disclosure is to provide an actuator for a parking brake capable of improving vehicle mountability of a product and improving a design freedom of the vehicle.

Another aspect of the disclosure is to provide an actuator for a parking brake that maintains a locked state when power is not applied to reduce vehicle current consumption and has a fail-safe function.

Technical Solution

In accordance with an aspect of the present disclosure, an actuator for a parking brake includes a motor generating power; a reduction gear portion configured to transmit the power of the motor to a parking portion implementing the parking braking of a vehicle; a locking portion configured to limit rotation of the reduction gear portion; and a housing in which the motor, the reduction gear portion, and the locking portion are accommodated; wherein the locking portion is configured to a lock gear coupled to the reduction gear portion to rotate together, a lever provided to be engaged with the lock gear through a hinge motion, an elastic member elastically supporting the lever toward the lock gear, and an electromagnet member that generates electromagnetic force when the power is applied to separate the lever from the lock gear.

The lever may have one end fixed to be pivotally by a pin inserted into the housing, and the other end thereof having gear teeth capable of engaging with the lock gear.

The lever may be arranged between the electromagnet member and the lock gear that are installed in the housing.

The elastic member may be provided as a torsion spring inserted into the pin and elastically supporting the lever toward the lock gear.

The reduction gear portion may include a driving gear interlocked with a drive shaft of the motor, a sun gear coupled to the driving gear to rotate together, a plurality of planetary gears meshed with the sun gear, and an external gear meshed with the plurality of planetary gears and having a connection portion connected to the parking portion.

The lock gear may be coupled with the sun gear to rotate together.

The lock gear may be provided as a ratchet gear.

The lever may include gear teeth capable of engaging with the lock gear on a surface facing the lock gear, and the electromagnet member may be disposed on the opposite side of the surface on which the gear teeth are formed.

The housing may be configured to accommodate the reduction gear portion on one side thereof, the motor on the other side thereof, and the locking portion between the reduction gear portion and the motor.

Advantageous Effects

An embodiment of disclosure may provide an actuator for a parking brake capable of suppressing a roll back of a vehicle during a parking braking.

Further, an embodiment of disclosure may provide an actuator for a parking brake capable of improving responsiveness and stability during the parking braking.

Further, an embodiment of disclosure may provide an actuator for a parking brake capable of improving vehicle mountability of a product and improving a design freedom of the vehicle.

Further, an embodiment of disclosure may provide an actuator for a parking brake that maintains a locked state when power is not applied to reduce vehicle current consumption and has a fail-safe function.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
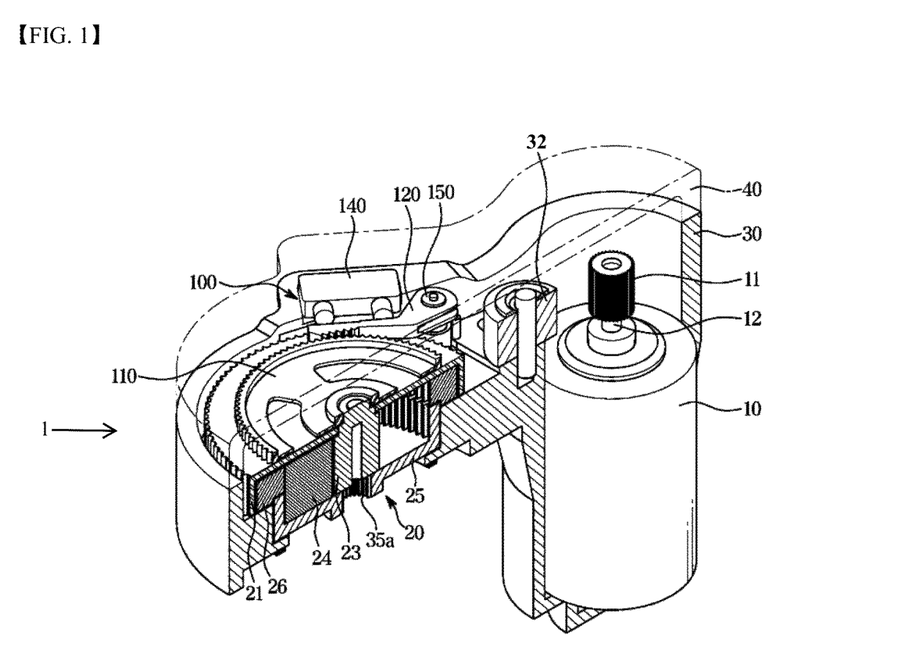
FIG. 1 is a cutaway perspective view illustrating a cross section of an actuator for a parking brake according to an embodiment of the disclosure.
Figure 2:
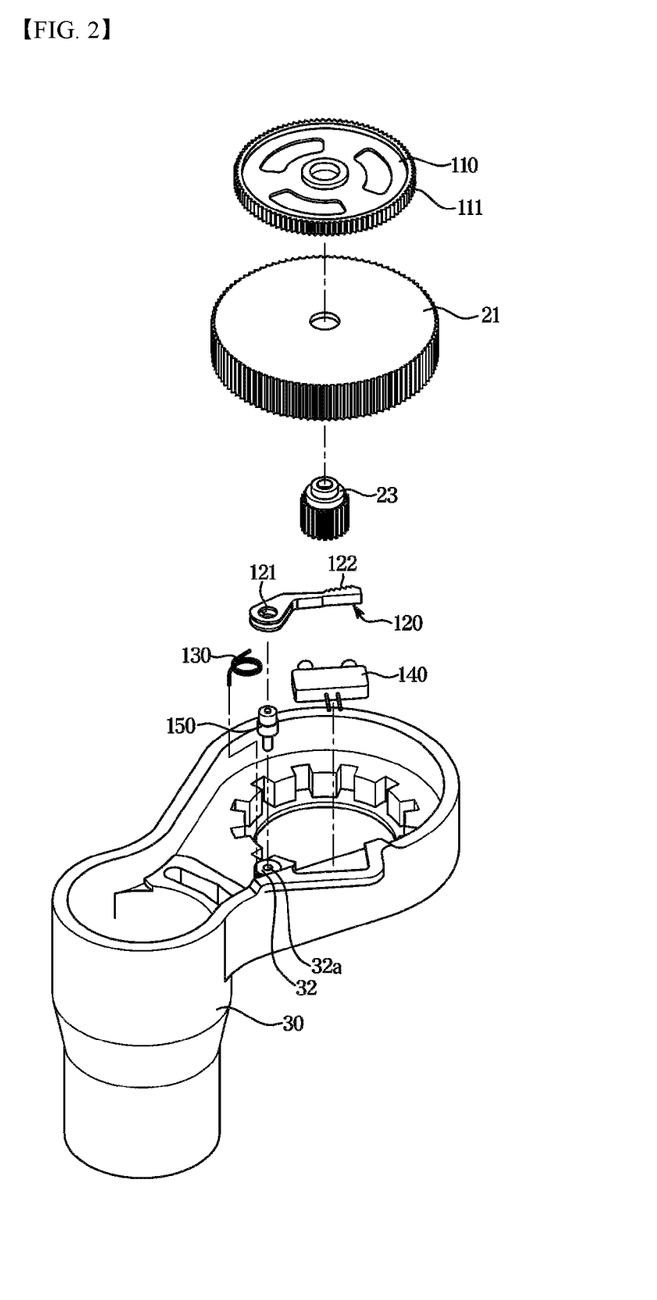
FIG. 2 is an exploded perspective view illustrating an actuator for a parking brake according to an embodiment of the disclosure.
Figure 3:
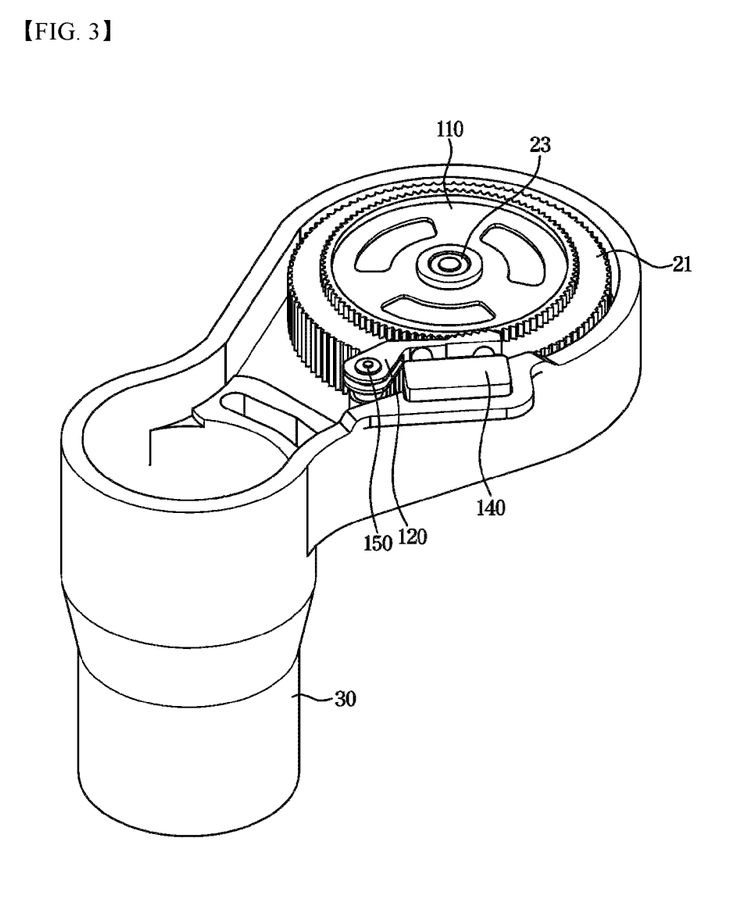
FIG. 3 is a schematically perspective view illustrating an actuator for a parking brake according to an embodiment of the disclosure.

FIG. 1 is a cutaway perspective view illustrating a cross section of an actuator for a parking brake according to an embodiment of the disclosure, FIG. 2 is an exploded perspective view illustrating an actuator for a parking brake according to an embodiment of the disclosure, and FIG. 3 is a schematically perspective view illustrating an actuator for a parking brake according to an embodiment of the disclosure.

Referring to FIGS. 1 to 3, an actuator 1 for a parking brake according to an embodiment of the disclosure may include a motor 10 that generates power, a reduction gear portion 20 for transmitting the power of the motor 10 to a parking portion (not shown) that implements a parking braking of a vehicle, a locking portion 100 for limiting rotation of reduction gear portion 20, a housing 30 in which the motor 100, the reduction gear portion 20, and the locking portion 100 are accommodated, and a housing cover 40 for closing the housing 30.

The motor 10 generates the power by receiving an electrical signal. The motor 10 is accommodated in an internal space of the housing 30 coupled to a vehicle body (not shown) or a caliper (not shown).

Furthermore, a rotation gear 12 is coupled to an end of a drive shaft 11 of the motor 10 to be interlocked with a driving gear 21 of the reduction gear portion 20 to be described later. For example, the rotation gear 12 of the motor 10 transmits power through a belt connecting the driving gear 21 or through at least one connecting gear (not shown) meshing with the driving gear 21.

The housing 30 may be provided to accommodate the motor 10, the reduction gear portion 20, and the locking portion 100, and the like. In particular, the housing 30 may accommodate and settles the motor 10 on one side thereof, and accommodate the reduction gear portion 20 on the other side thereof. The rotation shafts of the motor 10 and the reduction gear portion 20 may be arranged side by side.

The housing 30 is provided with a boss 32 protruding in a direction parallel to a rotation axis of the reduction gear portion 20 near the reduction gear portion 20, and a pinhole 32a is formed to be recessed in a center of the boss 32. A pin 150 may be inserted into the pinhole 32a and a lever 120 is fixed to be pivotally. Furthermore, a fixing member 33 for fixing an end of the elastic member 130 to be described later is provided on a side surface of the boss 32, and the fixing member 33 has a hole formed in a direction parallel to the pinhole 32a, the end of the elastic member 130 may be inserted thereto.

An electromagnet member 140 is installed near the boss 32 of the housing 30. More specifically, the electromagnet member 140 is installed inside the housing 30, and a lock gear 110, the lever 120, and the electromagnet member 140 may be installed inside the housing 30 in this order in a radial direction from a center of the lock gear 110.

The housing cover 40 may be provided to close the inside of the housing 30. Furthermore, the housing cover 40 may be provided with a recessed portion (not shown) to accommodate an upper end of the pin 150 at a position corresponding to the pin 150.

The reduction gear portion 20 may transmit the power of the motor 10 to the parking portion (not shown), and may adjust a gear ratio to decrease a speed while amplifying the torque.

The reduction gear portion 20 may include the driving gear 21 interlocked with the rotation gear 12, a sun gear 23 that is accommodated at a lower end of the driving gear 21 and is coupled to the same rotation shaft as the driving gear 21 to rotate together, a plurality of planetary gears 24 that are externally meshed with the sun gear 23, and an external gear 25 that are externally meshed with the plurality of planetary gears 24 to rotate and transmits power to the parking portion (not shown).

The rotation shaft of the reduction gear portion 20 may be provided parallel to the drive shaft 11 of the motor 10, and the driving gear 21 and the sun gear 23 may be coupled to the same rotation shaft to be rotatable together.

The driving gear 21 may be provided with a hollow at a lower side thereof to accommodate the sun gear 23, the planetary gears 24, and the external gear 25. As a result, the driving gear 21 may receive power from the motor 10 to transmit the power to the parking portion (not shown) through the sun gear 23, the planetary gears 24, and a connection portion 35a of the external gear 25 in sequence.

The lock gear 110 may be provided on an upper side of the driving gear 21. Both the driving gear 21 and the lock gear 110 may be connected to the same rotation shaft as the sun gear 23 to be rotatable together.

The sun gear 23 may be connected to the same rotation shaft as the driving gear 21 to be rotatable together.

The sun gear 23 may transmit power to the external gear 25 through at least one planetary gear 24 that is externally meshed. At this time, the planetary gears 24 may rotate in place.

The external gear 25 is externally meshed with the planetary gears 24 at thereinside, and the connection portion 35a, that is connected to the parking portion (not shown), provided on the lower side of the external gear 25 may transmit power from the planetary gears 24 to the parking portion (not shown). Furthermore, the external gear 25 may be supported by a support guide 26 on a side surface and a lower surface thereof.

The connection portion 35a may be provided in the form of a groove in which gear teeth are provided, and may be connected to the parking portion (not shown). For example, in a caliper brake system, the parking portion (not shown) may include a spindle-nut, a piston, and a pad plate, and the like, and the spindle is coupled to the connecting portion 35a to transmit power to press the pad plate against a disk. Because a specific operation of parking braking is a well-known technique, a detailed description thereof will be omitted. Furthermore, the actuator 1 for the parking brake of the disclosure is not limited to the caliper brake system, but is also applicable to the parking portion (not shown) of a drum brake system. Accordingly, it should be understood in the same manner that even if the connection portion 35a of the reduction gear portion 20 is connected to the parking portion (not shown) that implements parking braking of the drum brake system.

The locking portion 100 may limit a rotation of the reduction gear portion 20 to maintain a parking braking state. More specifically, the locking portion 100 may include the lock gear 110 coupled to the reduction gear portion 20 to rotate together, the lever 120 provided to be engaged with the lock gear 110 through a hinge motion (also referred to as pivoting), the elastic member 130 elastically supporting the lock gear 110 toward the lock gear 110, and the electromagnet member 140 that separates the lever 120 from the lock gear 110 by generating an electromagnetic force when power is applied.

The lock gear 110 may have a diameter smaller than that of the driving gear 21 and may be provided above the driving gear 21. The lock gear 110 is coupled to the rotation shaft of the sun gear 23 together with the driving gear 21 to be rotatable together.

Gear teeth 111 may be formed on an outer circumferential surface of the lock gear 110 to be engaged with gear teeth 122 of the lever 120. At this time, because the gear teeth 111 of the lock gear 110 is formed as ratchet gears, even though the lever 120 is engaged with the lock gear 110, the rotation of the lock gear 110 in one direction (a parking braking direction) may be allowed while the rotation in the opposite direction (a parking braking release direction) may be restricted.

One end of the lever 120 may be fixed pivotally to a pin 150 inserted into the housing 30, and the gear teeth 122 provided at the other end thereof may be engaged with the lock gear 110. More specifically, the pin 150 is inserted through a hole 121 of one end of the lever 120 to force the lever 120 to be fixed to the boss 32 rotatably in a direction perpendicular to an axis of the pin 150. Furthermore, a surface of the other end of the lever 120 facing the lock gear 110 is provided with the gear teeth 122 having a shape corresponding to the gear teeth 111 of the lock gear 110, so that the lever 120 and the lock gear 110 may be engaged with each other. As a result, the lever 120 is selectively brought into close contact with the lock gear 110 through the hinge motion to prevent the rotation of the reduction gear portion 20.

The lever 120 may be arranged between the lock gear 110 and the electromagnet member 140. Accordingly, the lever 120 may be spaced apart from the lock gear 110 by the electromagnetic force of the electromagnet member 140 when a locking mode is released.

The lever 120 may be made of a material movable by electromagnetic force, for example, at least a part thereof may be made of a metal material.

The elastic member 130 is provided as a torsion spring to elastically support the lever 120 toward the lock gear 110. One end of the elastic member 130 may be inserted into and fixed to the fixing member 33 and the other end thereof may elastically supports the lever 120 toward the lock gear 110. Furthermore, the elastic member 130 may be inserted and fixed to the pin 150 by penetrating the pin 150.

The electromagnet member 140 may be provided to generate electromagnetic force when power is applied to separate the lever 120 from the lock gear 110. More specifically, the electromagnet member 140 may be provided with a coil 141 wound a plurality of times inside or outside, for example, the coil 141 is wound on two protruding rods, respectively as shown in the drawings to generate electromagnetic force.

Furthermore, the magnitude of the electromagnetic force generated by the electromagnet member 140 is greater than that of the elastic force of the elastic member 130 described above so that the lever 120 may maintain a constant distance from the lock gear 110 when the vehicle is driving.

Hereinafter, an operation of the actuator 1 for a parking brake according to an embodiment of the disclosure will be described.

Figure 4:
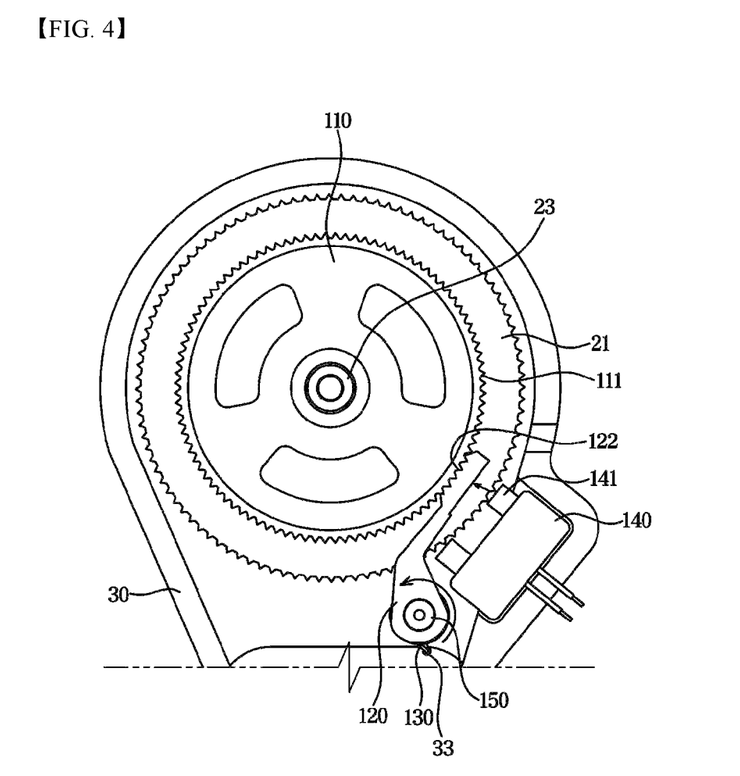
FIG. 4 is a cross-sectional view illustrating an operation of a actuator for a parking brake in a locking mode according to an embodiment of the disclosure.
Figure 5:
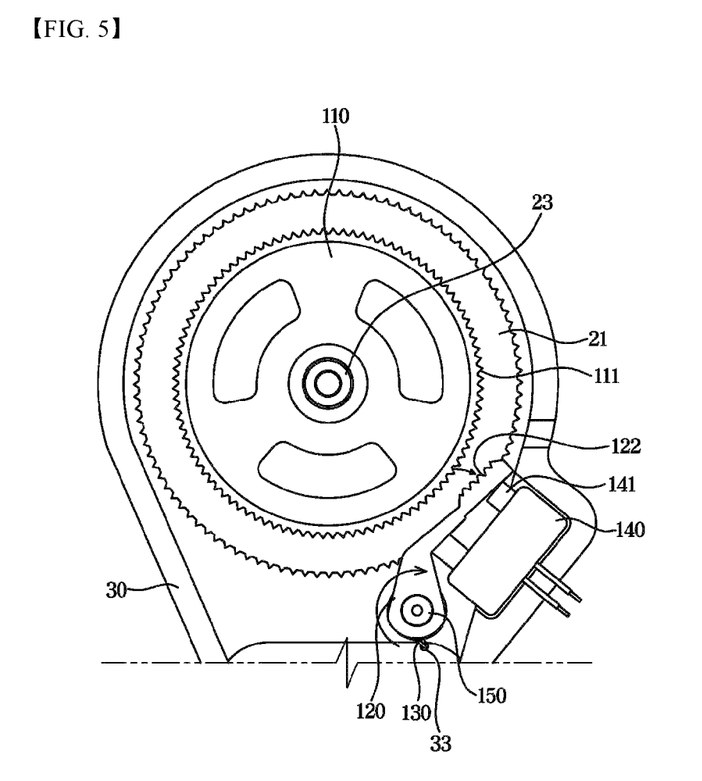
FIG. 5 is a cross-sectional view illustrating an operation of the actuator for parking brake when the locking mode is released according to an embodiment of the disclosure.

FIG. 4 is a cross-sectional view illustrating an operation of the actuator 1 for the parking brake in the locking mode according to an embodiment of the disclosure, and FIG. 5 is a cross-sectional view illustrating an operation of the actuator for parking brake when the locking mode is released according to an embodiment of the disclosure.

Referring to FIGS. 4 and 5, the actuator 1 for the parking brake according to an embodiment of the disclosure may operate in the locking mode for maintaining the parking braking state of the vehicle and in a locking release mode due to the release of the parking braking of the vehicle.

First, in the locking mode, the actuator 1 for the parking brake receives an electric signal from an electronic control unit (ECU, not shown), generates power to the motor 10, and transmits the power to the parking portion (not shown) through the reduction gear portion 20, thereby implementing the parking braking. When the parking braking is completed, the locking portion 100 prevents the reduction gear portion 20 from rotating in the direction in which the braking is released in order to maintain the braking state.

More specifically, when the braking is completed, the power applied to the electromagnet member 140 is released, and the electromagnetic force acting on the lever 120 extinguished. At this time, the lever 120 is elastically supported toward the lock gear 110 by the elastic member 130, and the gear teeth 122 of the lever 120 and the gear teeth 111 of the lock gear 110 are engaged with each other, so that preventing the gear 110 from rotating.

Next, when the locking mode is released, the actuator 1 for the parking brake operates the locking portion 100 so as to release the parking braking, thereby allowing the reduction gear portion 20 to rotate in the braking release direction.

More specifically, the ECU (not shown) applies power to the electromagnet member 140 to generate electromagnetic force, and thus the lever 120 is spaced apart from the lock gear 110 by the electromagnetic force. At this time, the electromagnetic force is greater than the elastic force of the elastic member 130 for elastically supporting the lever 120 toward the lock gear 110, so that the lever 120 is spaced apart from the lock gear 110. Accordingly, a gap is generated between the lock gear 110 and the lever 120, the engaging between the gear teeth 111 and 122 is released, thereby allowing the reduction gear portion 20 to rotate.

When the locking portion 100 is spaced apart, the motor 10 receiving the electrical signal from the ECU (not shown) generates power in a direction to release the parking braking and transmits the power through the reduction gear portion 20, thereby implementing the braking release.

As described above, the actuator 1 for the parking brake according to an embodiment of the disclosure may prevent the braking from being released in the parking braking state. Furthermore, because the power is not applied to the locking portion 100 in the locking mode, it is possible to quickly and stably maintain the posture of the vehicle without additional current consumption in the parking state of the vehicle. Moreover, the actuator 1 for the parking brake of the disclosure may suppress a roll back phenomenon of the vehicle even during parking braking at an inclined place.

Furthermore, the actuator 1 for the parking brake according to an embodiment of the disclosure may be manufactured without significantly changing an assembly process of the product in a form in which only the locking portion 100 is added to the conventional actuator.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An actuator for a parking brake of a vehicle, comprising:
    a motor configured to generate a power;
    a reduction gear portion configured to transmit the power of the motor to the parking braking of the vehicle;
    a locking portion configured to limit rotation of the reduction gear portion; and
    a housing in which the motor, the reduction gear portion, and the locking portion are accommodated;
    wherein the locking portion comprises:
    a lock gear coupled to the reduction gear portion so as to rotate together,
    a lever configured to controllably engage with the lock gear through a hinge motion,
    an elastic member configured to push the lever toward the lock gear, and
    an electromagnet member configured to controllably generate an electromagnetic force when the power generated by the motor is applied so as to separate the lever from the lock gear,
    wherein the electromagnet member comprises a coil wrapped around one or more rods that protrude from the electromagnet member toward the lever.

2. The actuator of claim 1, wherein the lever has one end fixed to be pivotally by a pin inserted into the housing, and the other end thereof having gear teeth capable of engaging with the lock gear.

3. The actuator of claim 2, wherein the lever is arranged between the electromagnet member and the lock gear that are installed in the housing.

4. The actuator of claim 3, wherein the elastic member comprises a torsion spring that is inserted into the pin and that elastically pushes the lever toward the lock gear.

5. The actuator of claim 1, wherein the reduction gear portion comprises:
    a driving gear interlocked with a drive shaft of the motor,
    a sun gear coupled to the driving gear to rotate together,
    a plurality of planetary gears meshed with the sun gear, and
    an external gear meshed with the plurality of planetary gears and having a connection portion connected to the parking brake.

6. The actuator of claim 5, wherein the lock gear is coupled with the sun gear so as to rotate together.

7. The actuator of claim 6, wherein the lock gear comprises a ratchet gear.

8. The actuator of claim 1, wherein
    the lever includes gear teeth capable of engaging with the lock gear on a surface facing the lock gear, and
    the electromagnet member is disposed on the opposite side of the surface on which the gear teeth are formed.

9. The actuator of claim 1, wherein the housing is configured to accommodate the reduction gear portion on one side thereof, the motor on an other side thereof, and the locking portion between the reduction gear portion and the motor.

\* \* \* \* \*